Sept. 21, 1937.    M. WAGNER    2,093,625
PERMANENT MOLDING APPARATUS
Filed June 16, 1936    2 Sheets-Sheet 1
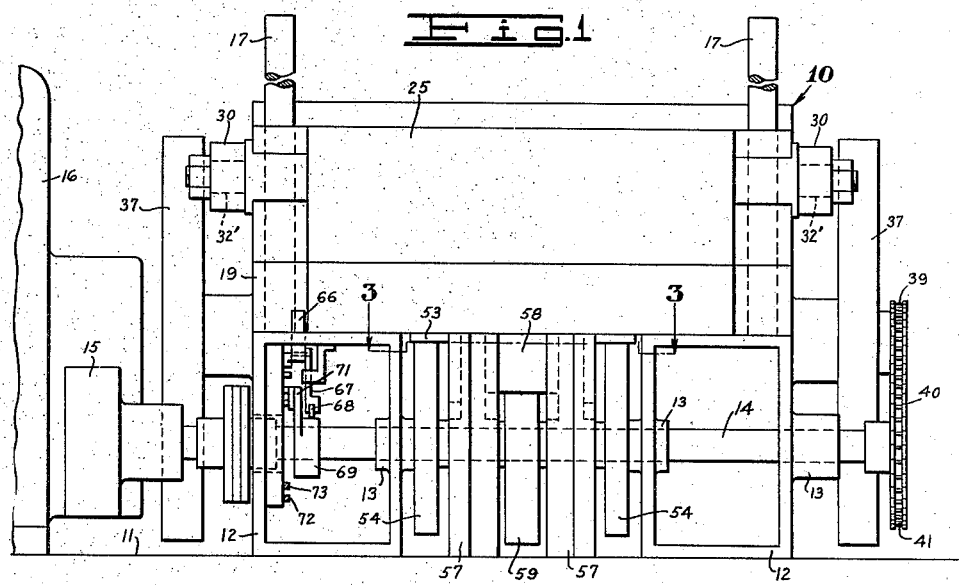
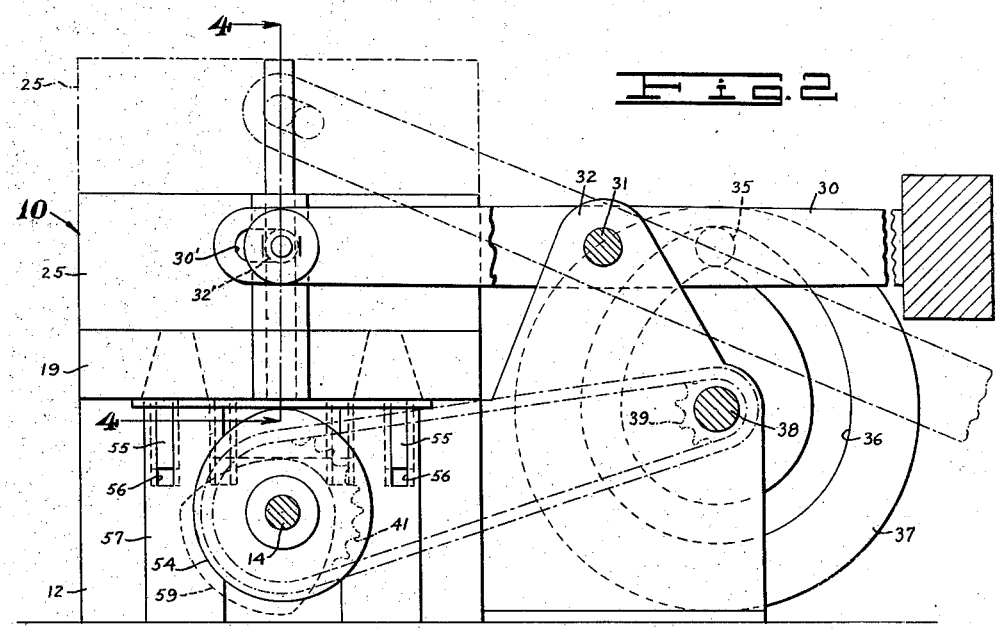
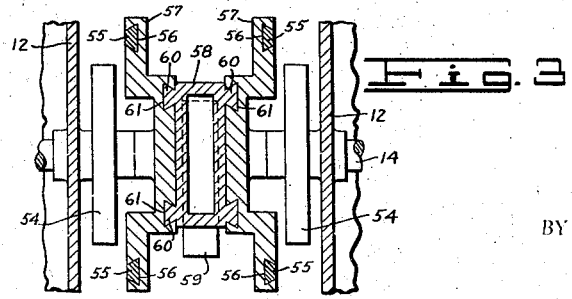
INVENTOR.
MATTHEW WAGNER.
BY
ATTORNEY.

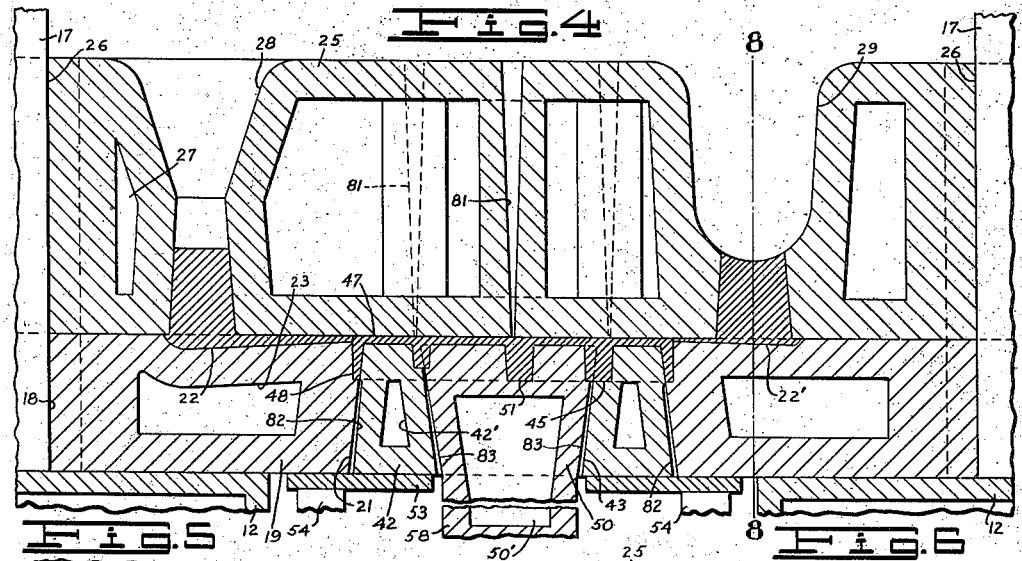

Patented Sept. 21, 1937

2,093,625

UNITED STATES PATENT OFFICE 2,093,625

PERMANENT MOLDING APPARATUS

Matthew Wagner, Glendale, Calif.

Application June 16, 1936, Serial No. 85,469

6 Claims. (Cl. 22—92)

This invention relates to permanent molding apparatus.

The general object of the invention is to provide an improved permanent mold whereby articles of various sizes and of more or less complicated configuration can be readily made in permanent molds.

Another object of the invention is to provide a novel permanent mold including a base, a mold member, and a core associated with the mold member, and wherein the parts are mounted in a novel manner for movement from a molding to a discharge position.

Another object of the invention is to provide an improved mold for use in a permanent molding apparatus.

Another object of the invention is to provide improved means for moving the mold members of the permanent mold.

Other objects and the advantages of the invention will be apparent from the following description taken in connection with the accompanying drawings, wherein:

Fig. 1 is a front view of the molding apparatus;

Fig. 2 is an enlarged end view of the apparatus with portions thereof in section and showing the drive and sprockets in position;

Fig. 3 is a section taken on line 3—3 of Fig. 1;

Fig. 4 is an enlarged section taken on line 4—4 of Fig. 2;

Fig. 5 is a fragmentary top plan view of the mold base;

Fig. 6 is a fragmentary view showing the lower face of the mold cover;

Fig. 7 is a top plan view of the mold including the core;

Fig. 8 is a section taken on line 8—8 of Fig. 4 on a reduced scale;

Fig. 9 is a diagrammatic view of the electrical wiring of the apparatus;

Fig. 10 is a diagrammatic view of the mold base and mold showing them in one position;

Fig. 11 is a view similar to Fig. 10 showing the base and mold in another position; and Fig. 12 is a top plan view of the apparatus on a reduced scale.

Referring to the drawings by reference characters I have shown my invention as embodied in a mold apparatus which is indicated generally at 10. As shown the apparatus is mounted on a suitable support 11 and includes suitably spaced brackets 12 which are provided with bosses 13 which are apertured to receive a shaft 14 which may be suitably driven by a reduction gear device 15 from a motor 16.

Mounted upon the end of the brackets 12 I show a plurality of upwardly extending posts 17 which pass through apertures 18 in a stationary mold base 19.

This mold base 19 is provided with a central aperture 20 which, as shown in the drawings, is rectangular although it may be of any suitable configuration. The walls 21 of the opening 20 flare downwardly as clearly shown in Fig. 1 while the upper surface of the mold base at one side of the opening 20 is provided with a shallow flaring inlet gate groove 22 and with a similar outlet groove 22' at the other side (see Fig. 5). The mold base 19 may be provided with a suitable circulation cavity 23 through which oil or other fluid may be circulated for cooling if desired.

Resting upon the mold base I show a cover member 25 which is provided with apertures 26 which slidably engage the posts 17 so that the cover may be raised and lowered as will be presently described. The cover is provided with a cavity 27 which extends peripherally about the same and which provides suitable circulation.

The cover is provided with a pouring basin 28 through which molten metal may be poured through the cover into the inlet groove 22. The cover is also provided with an outlet opening 29 which at its bottom communicates with the outlet groove 22' at the outlet end of the molding cavity. In practice the wall of the opening 29 may receive a coat of shellac or other suitable material. In operation the poured metal crystallizes at the bottom of the opening 29 so that an effective plug is provided.

In order that the cover may be raised I provide a suitable drive mechanism which includes a lever 30 mounted at each end of the mold cover on a trunnion 31. This trunnion is mounted on brackets 32 which are integral with the brackets 12. The mold cover 25 adjacent each of the arms 30 includes a trunnion 32' which is positioned in a slot 33' of the adjacent arm 30. The lever 30 is provided with a cam pin 35 which fits in a cam groove 36 in a cam member 37 which is mounted on a shaft 38. This shaft 38 has a sprocket 39 thereon which is driven by a chain 40 from a sprocket 41 mounted on the shaft 14, previously described.

Positioned in the base aperture 21 I provide a mold member 42 having a central opening 43 therein. The side walls 44 of the mold member are flared outwardly and downwardly to fit the side walls of the opening 21 and the side walls of the opening 43 are inclined outwardly upward. The upper surface of the form mold member 42 has recesses 45 therein and bosses 46 thereon to form various portions of the device to be cast, such, for example, as the case of a lock.

When the mold member 42 is in a casting position the top thereof is spaced from the bottom of the cover member 25 to form a chamber 47. The side walls 21 of the base 19 are recessed as at 48, which recess communicates with the chamber 47. The mold member 42 like the base 19 is preferably made hollow to form a chamber 42' therein through which oil may be circulated.

Positioned in the opening 43 of the mold member 42 I provide a supplemental mold member 50 the side walls of which converge downwardly to fit the side walls of the mold opening 43. When the device is in a casting position the upper surface of the supplemental mold member 50 is flush with the upper surface of the mold member 42. Like the mold member the upper surface of the supplemental mold member 50 has recesses 51 therein and bosses 52 thereon to form various portions of the device to be cast. The supplemental mold member 50 like the mold member 42 is preferably made hollow to form a chamber 50' therein in which oil may be circulated.

The mold member 42 is mounted on a plate 53 which is supported on a pair of spaced cams 54 which are mounted on and secured to the shaft 14. Furthermore the plate 53 adjacent each of the cams 54 includes a pair of spaced dovetailed rails 55 which are slidably positioned in dovetailed grooves 56 in brackets 57. (See Fig. 3.)

The supplemental mold member 50 includes a downwardly extending portion 58 which is supported on a cam 59 which is mounted on and secured to the shaft 14. Furthermore the supplemental mold portion 58 includes dovetailed rails 60 which are slidably positioned in dovetailed grooves 61 in the brackets 57. (See Fig. 3.)

As shown in Fig. 1 and diagrammatically in Fig. 9 I provide a switch mechanism 62 for controlling the operation of the mold device. As shown the switch device 62 includes a pivoted switch arm 63 which is adapted to bridge a set of contacts 64 and 65 and may be operated by a button 66. Intermediate the contacts and the pivoted point of the switch arm a depending rod 67 is pivotally secured thereto which has a roller 68 on the lower end thereof.

The roller 68 engages a cam 69 which is mounted on and secured to the shaft 14. The cam 69 has a recess 70 in the periphery thereof which in one position of the cam allows the switch arm 63 to bridge the contacts 64 and 65 but when the cam rotates and the recess 70 moves out of the one position the periphery of the cam forces the rod 67 upwardly thereby swinging the switch arm out of engagement with the contacts 64 and 65.

The cam 69 has a contact arm 71 thereon which is adapted to bridge a set of circular stationary annular contact tracks 72 and 73. The contact tracks have spaced ends between which the contact arm 71 is positioned when the switch rod roller is positioned in the recess 70 of the cam 69. Thus when the switch arm 63 bridges the contacts 64 and 65 the contact arm 71 does not engage the contact tracks 72 and 73 and when the contact arm 71 engages the contact tracks 72 and 73 the switch arm 63 does not bridge the contacts 64 and 65. As shown one terminal of the motor 16 is connected by a wire 74 to one side of a source of electrical energy which is shown as a battery 75. The opposite side of the battery 75 is connected by a wire 76 to the contact 64 and is furthermore connected by a wire 77 to the contact track 72.

The contact track 73 is connected by a wire 78 to the contact 65 and by a wire 79 to the other terminal of the motor 16. Thus when the contacts 64 and 65 are bridged by the switch arm 63 current flows through the wire 76 through the contacts 64 and 65 and the switch arm 63 and the wire 79 to the motor 16 and returns to the battery through the wire 74 thereby operating the motor 16 which rotates the shaft 14.

When the shaft 14 is rotated the cam 69 rotates therewith thereby bringing the contact arm 71 into engagement with the contact tracks 72 and 73 and moving the switch arm 63 out of engagement with the contacts 64 and 65. The current then flows from the battery 75 through the wires 76 and 77 to the contact track 72, thence through the contact arm 71 to the contact track 73 and thence through the wire 79 to the motor 16 and returns to the battery through the wire 74 thereby maintaining the motor 16 in operation until the cam 69 has made one complete revolution whereupon the contact arm moves into the space between the ends of the contact tracks thereby breaking the circuit to the motor and as the switch arm 63 must be manually moved into engagement with the contacts 64 and 65 the motor ceases to operate.

In operation the cover member 25 engages the upper surface of the mold base 18 and the mold member 42 is positioned completely in the base and the upper surface of the supplemental mold member 50 is flush with the upper surface of the mold member. The operator then pours molten metal in the pouring basin 28, which molten metal flows into the gate recess 22 thence into the chamber 47 and recess 48 and thence out through the recess 22' and up into the aperture 29. After pouring a sufficient quantity of molten metal into the mold the operator presses the switch button 66 which moves the switch arm 63 into engagement with the contacts 64 and 65 thereby causing the motor 16 to operate and rotate the shaft 14 as previously described. As the shaft rotates it rotates the shaft 38 through the medium of the previously described sprockets and chain.

The cam groove 36 and the form cams 54 are so shaped that when the shafts 14 and 38 start to rotate, the cam groove 36 through the medium of the arms 30 moves the cover member 25 upwardly to the position indicated by the broken lines in Fig. 2 and the cams 54 move to allow the mold member 42 to move downwardly to the position shown in Fig. 10. The supplemental mold cam 59 is so shaped that after a predetermined lapse of time it forces the supplemental mold member 50 upwardly which in turn moves the casting member 80 in the mold upwardly with it as shown in Fig. 11.

The operator then removes the member 80 and as the cams continue to rotate, the supplemental mold member 50 moves downwardly, the mold member 42 moves upwardly and the cover member 25 moves downwardly until when contact through the arm 71 and the contact tracks 72 and 73 is broken the cover, mold and supplemental mold are all in their initial position and the mold device is in condition for another pouring of metal.

The cover 25 is shown as having a plurality of downwardly converging apertures 81 therein which open into the chamber 47 to allow gases to escape therefrom when molten metal is poured into the mold. For the same purpose a plurality of upwardly converging grooves 82 are provided in the side walls 44 of the mold member 42 and a plurality of upwardly convergent grooves 83 are provided in the side walls of the supplemental mold member 58.

From the foregoing description it will be apparent that I have invented an improved permanent mold which can be economically manufactured and which is highly efficient in use.

Having thus described my invention I claim:

1. In a permanent mold apparatus, a base, a cover movably mounted on said base, said base having an opening, a main mold member in said opening, said main mold member having an opening, a supplemental member mounted in said main mold member opening, said main mold member and said supplemental mold member being movably mounted, cam means to shift said cover, other cam means to shift said main mold member and additional cam means to shift said supplemental mold member into and out of molding position.

2. In a permanent mold apparatus, a base, a cover, means to mount said cover to move toward and from said base, said base having an opening therein, a main mold member mounted in said opening, means to raise and lower said main mold member, said main mold member having an opening therein, a supplemental mold member mounted in said main mold member opening, means to independently move said main mold member and said supplemental mold member, said main mold member and said supplemental mold member having casting cavities therein, and means to direct molten metal to said casting cavities.

3. In a permanent mold apparatus, a base, a cover, means to mount said cover for movement towards and from the base, said base having an opening therein, a main mold member mounted in said opening, said main mold member having an opening therein, a supplemental mold member mounted in said main mold member opening, means to mount said mold members for independent movement relative to said base, said main mold member and said supplementary mold member having complemental casting cavities therein, said covering engaging the top of said mold members and forming one wall of said casting cavities; a pivoted lever, cam means to rock said lever, means connecting one end of said lever to said cover whereby when the lever is shifted the cover will be moved, cam means for shifting said main mold members and other cam means for shifting said supplemental mold member, a motor for driving said shaft and means for controlling said motor.

4. In a permanent mold apparatus, a base, a cover, means to mount said cover to move toward and from said base, said base having an opening therein, a main mold member mounted in said opening, means to raise and lower said main mold member, said main mold member having an opening therein, a supplemental mold member mounted in said main mold member opening, means to move said main mold member into and out of said main mold member opening and other means operable independently of said last mentioned means to move said supplemental mold member into and out of said main mold member aperture, said main mold member and said supplemental mold member having casting cavities therein, said base having a channel leading to said casting cavities and also having a second channel leading away from said casting cavities.

5. In a permanent mold apparatus, a base, a cover, means to mount said cover for movement towards and from the base, said base having an opening therein, a main mold member mounted in said opening, said main mold member having an opening therein, a supplemental mold member mounted in said main mold member opening, means to mount said mold members for independent movement relative to said base, said main mold member and said supplementary mold member having complemental casting cavities therein, said covering engaging the top of said mold members and forming one wall of said casting cavities; said base having a channel leading to said cavities and having a second channel leading from the cavities, a shaft adjacent to said base, a pair of cam members, means whereby said shaft drives said cam members, a pair of pivoted levers, means whereby said cams rock said levers, means connecting said levers to said cover for shifting the same, cam means on said shaft for shifting said main mold members and other cam means on said shaft for shifting said supplemental mold member, a motor for driving said shaft and cam means for controlling said motor.

6. In a permanent mold apparatus, a base, a cover, means to mount said cover to move toward and from said base, said base having an opening therein, said opening flaring downwardly, a main mold member mounted in said opening, means to raise and lower said main mold member, said main mold member having an opening therein, a supplemental mold member movably mounted in said main mold member opening, means to move said main mold member into and out of said main mold member opening and other means operable independently of said last mentioned means to move said supplemental mold member into and out of said main mold member aperture, said base, said main mold member and said supplemental mold member all having casting cavities therein, said base having a channel leading to said casting cavities and also having a second channel leading away from said casting cavities, said cover member having a pair of apertures therein, one of said apertures communicating with the first of said channels and the other aperture communicating with the second channel.

MATTHEW WAGNER.